United States Patent
Obermeier-Hartmann et al.

(10) Patent No.: US 10,737,735 B2
(45) Date of Patent: Aug. 11, 2020

(54) TRACTION WHEEL FOR A TRACK ROLLER UNIT

(71) Applicant: CLAAS Industrietechnik GmbH, Paderborn (DE)

(72) Inventors: Robert Obermeier-Hartmann, Bad Driburg (DE); Sascha Rackow, Paderborn (DE); Andre Riemer, Paderborn (DE); Thomas Schulte, Delbrueck (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 113 days.

(21) Appl. No.: 16/005,987

(22) Filed: Jun. 12, 2018

(65) Prior Publication Data

US 2018/0354569 A1    Dec. 13, 2018

(30) Foreign Application Priority Data

Jun. 13, 2017    (DE) .......................... 10 2017 112 930

(51) Int. Cl.
*B62D 55/135*    (2006.01)
*B62D 55/12*    (2006.01)
*B62D 55/125*    (2006.01)

(52) U.S. Cl.
CPC ........... *B62D 55/135* (2013.01); *B62D 55/12* (2013.01); *B62D 55/125* (2013.01)

(58) Field of Classification Search
CPC ..... B62D 55/135; B62D 55/12; B62D 55/125
USPC ........................................................ 305/184
See application file for complete search history.

(56) References Cited

U.S. PATENT DOCUMENTS

| 1,549,594 | A |   | 8/1925 | Menningen |
| 5,190,363 | A | * | 3/1993 | Brittain ................ B62D 55/088 305/137 |
| 5,769,512 | A |   | 6/1998 | Kautsch |
| 6,371,579 | B1 | * | 4/2002 | Phely ................... B62D 55/088 305/115 |
| 7,090,312 | B2 |   | 8/2006 | Soucy et al. |
| 7,416,266 | B2 |   | 8/2008 | Soucy et al. |
| D647,118 | S | * | 10/2011 | Parker .......................... D15/148 |
| 2004/0145239 | A1 | * | 7/2004 | Deckler ................. B60B 3/041 305/193 |

(Continued)

FOREIGN PATENT DOCUMENTS

DE    60219697 T2    12/2007
EP    0512467 A2    11/1992

OTHER PUBLICATIONS

European Search Report dated Nov. 8, 2018 in European Application No. .18 17 3142 with English translation of the relevant parts.

*Primary Examiner* — Kip T Kotter
(74) *Attorney, Agent, or Firm* — Collard & Roe, P.C.

(57) ABSTRACT

A traction wheel for a track roller unit of an agricultural working machine has at least one drive wheel for driving an elastic track belt of the track roller unit. The at least one drive wheel comprises supporting arms which extend from an axis of rotation of the drive wheel in the radial direction in the manner of spokes and a gap is formed radially on the outside, at least between two adjacent supporting arms in each case. At least one friction element is situated, in particular detachably, radially outwardly on a supporting arm for non-positive interaction with the track belt.

8 Claims, 2 Drawing Sheets

(56) References Cited

U.S. PATENT DOCUMENTS

| | | | |
|---|---|---|---|
| 2006/0125318 A1* | 6/2006 | Soucy | B62D 55/125 305/178 |
| 2011/0048817 A1* | 3/2011 | Bessette | B62D 55/084 180/9.62 |
| 2012/0242142 A1 | 9/2012 | Kautsch et al. | |

* cited by examiner

TRACTION WHEEL FOR A TRACK ROLLER UNIT

CROSS-REFERENCE TO RELATED APPLICATIONS

This application claims priority under 35 USC 119 of German Application No. 10 2017 112 930.8, filed on Jun. 13, 2017, the disclosure of which is herein incorporated by reference.

SUMMARY OF THE INVENTION

The invention relates to a traction wheel for a track roller unit of an agricultural working machine and to a track roller unit and an agricultural vehicle.

Agricultural working machines, such as tractors or self-propelled harvesting machines, are being designed to be increasingly larger in size and more powerful in order to enable more efficient processing of agricultural fields. In so doing, as the dead weight of the working machines increases, so does the permissible overall weight which must be supported on the ground. A high overall weight often also allows for a high ballasting of the agricultural working machine, which can be situated on the working machine in a variable manner depending on the work to be performed, for example, in order to influence a displacement of the center of gravity of the working machine. In order to preferably avoid a disadvantageous ground compression in this case, it is a worthwhile goal to increase the contact surface on the ground, wherein, in the case of pneumatic tires, as the ground contact surface increases, so does the diameter of the tires, whereby the necessary installation space increases.

Therefore, track roller units having a large ground contact surface due to the design are being utilized to an increasing extent, which comprise, for example, a track belt made of an elastic material such a rubber. The track roller unit usually comprises, in this case, a traction wheel for driving, for example, in a non-positive or frictional manner, the track belt, and comprises at least one land wheel and track-supporting rollers situated therebetween. The disadvantage of the use of these types of track roller units is a possible impairment of the power transmission between the traction wheel and the track belt due to friction-reducing materials such as dirt, mud, clay, or other types of debris.

In order to reduce this soiling, U.S. Pat. No. 5,769,512 A1, for example, describes a traction wheel which has been cast as a single piece and comprises friction surfaces which are situated so as to alternate radially on the outside in order to transfer power from the traction wheel to the track belt, and comprises recesses for removing debris. The alternating recesses and friction surfaces are situated on both sides of a guide groove which interacts with guide blocks of the track belt in order to guide the track belt. Due to the recesses, debris which adversely affects power transmission and is situated between the traction wheel and the track belt can be removed. In cases in which debris is particularly heavy, for example, during or after the track roller unit has at least partially sunk into wet, soft ground, debris cannot be reliably removed. In addition, this type of traction wheel requires a relatively high belt tension for a reliable power transmission between the traction wheel and the track belt. The track belt can become damaged by the traction wheel as a result, however, whereby costly and time-consuming repair work becomes necessary.

SUMMARY OF THE INVENTION

It is therefore an object of the invention to provide a traction wheel for a track roller unit of an agricultural working machine, which has improved functional reliability and allows for a reduction in the amount of service and maintenance work required.

This object is solved according to the invention by a traction wheel for a track roller unit of an agricultural working machine having at least one drive wheel for driving an elastic track belt of the track roller unit, in which the drive wheel comprises supporting arms which extend from an axis of rotation of the drive wheel in the radial direction in the manner of spokes and a gap is formed radially on the outside, at least between each of two adjacent supporting arms. At least one friction element is situated, in particular detachably, radially outwardly on a supporting arm for the non-positive interaction with the track belt. The gaps formed at the ends between adjacent supporting arms can extend across the entire width of the drive wheel and allow for a reliable removal of debris located between the traction wheel or the drive wheel and the track belt, which debris could adversely affect a frictional power transmission. In addition, at least one gap can be formed in a supporting arm, radially on the outside. Due to the spoke-like arrangement of the supporting arms, a recess extending in the radial direction is formed between two adjacently situated supporting arms. Due to these recesses, which are formed on the supporting arm or the drive wheel in addition to the gaps, it is possible for heavy debris to be removed, for example, after the track roller unit has at least partially sunk into wet, soft ground. The friction elements, which are situated radially outwardly on the ends of the supporting arms and are made, for example, of rubber, improve the power transmission between the traction wheel or the drive wheel and the track belt, wherein an unnecessarily high amount of wear on the track belt can be avoided. The friction elements can comprise tread grooves situated radially on the outside, on the track-belt side, whereby a removal of debris between the traction wheel or the friction element and the track belt, as well as power transmission, can be further improved. Due to the improved power transmission and the reduced wear of the track belt, the functional reliability can be improved. Due to the installation of the friction elements on the individual supporting arms, it becomes possible to replace individual friction elements according to demand, whereby the amount of service and maintenance work required and, therefore, the maintenance costs, can be reduced.

In one preferred embodiment of the invention, a web is situated between mutually adjacent supporting arms, which connects the supporting arms to each other radially in the interior of the gap. The web is situated in the interior of the gap in this case, without adversely affecting its function. Due to the arrangement of webs between the supporting arms, the strength of the drive wheel or of the traction wheel can be improved, for example, for the case in which stones enter the traction wheel.

Particularly advantageously, at least one supporting element is provided in order to be situated radially on the outside, in particular detachably, on a supporting arm, wherein at least one friction element is situated radially on the outside, in particular detachably, on the supporting element. Due to the arrangement of the friction element on a supporting arm and its fastening on the end of a supporting arm, the friction element can have a shape which can be configured independently of the supporting arm and is adaptable to different circumstances. In addition, in the case of larger friction elements, forces which occur can be introduced into the supporting arm in a better way. A supporting element can be designed, for example, in the form of a sheet-metal component or a cast part. A supporting element can be situated on the supporting arm so as to be displaceable, for example, in the axial direction, relative to the axis of rotation. This makes it possible to adapt the alignment of the supporting element, during the installation of the supporting element, relative to the supporting arm, for example, in the case of different configurations of track belts.

In yet another preferred embodiment of the invention, a supporting arm and/or a supporting element has a connecting profile for the non-positive and/or positive accommodation of a friction element. The connecting profile can be designed, for example, in the form of a dovetail guide or a slot for accommodating fasteners. The connecting profile allows for a simplified installation of a friction element on the supporting element and/or supporting arm, for example, via insertion into the connecting profile and fastening by means of one or multiple fasteners.

Advantageously, a supporting element includes a guide profile for interacting with guide blocks of the track belt. The guide profile can be formed, in this case, in the axial direction, laterally, and/or on the guide-block side, for example, in the form of a bend, on the supporting element. In this case, a guide profile can be formed which is situated on the guide-block side, is formed essentially in parallel to the axis of rotation, and is planar and/or bulged. The guidance of the track belt by means of the guide profiles of the supporting elements allows for a low-cost guidance of the track belt, which is easily replaced if damaged. Due to an axial displacement of the supporting elements, a simple adaptation of the guide profiles to differently configured track belts and/or guide blocks can also be made possible.

In yet another preferred embodiment, the guide profiles of the supporting elements form an essentially annular, in particular continuous, guide surface about the axis of rotation. The guide profile can be designed to be wider in the circumferential direction than the rest of the supporting element and/or the friction element situated thereon. As a result, an essentially closed guide surface can be formed on the guide-block side, while retaining the gap between two friction elements and/or supporting elements. The guide surface can be designed to be annular about the axis of rotation in this case. This has the advantage of better guidance of the track belt over the guide blocks situated thereon, on the inside. In addition, wear of the track belt and/or the guide blocks can be reduced due to the essentially closed guide surface.

In yet another advantageous embodiment of the invention, a supporting element and/or friction element is situated on the supporting arms, radially on the outside, essentially in parallel to or angled with respect to the axis of rotation of the traction wheel. As a result, a variable arrangement of the supporting elements and/or friction elements circumferentially on the drive wheel can be made possible. This has the advantage that different profiles can be formed, due to the arrangement of the friction elements and/or supporting elements, whereby an optimal removal of material causing slip between the traction wheel and the track belt can be made possible, for example, depending on environmental conditions and/or the track belt.

It is also advantageous that the traction wheel comprises two drive wheels which are situated in a rotationally fixed manner and spaced apart from each other on a drive axle. The traction wheel is formed, in this case, by two drive wheels situated, spaced apart from each other, on the drive axle. The drive wheels can be situated, in this case, on the drive axle with their particular guide profiles and/or guide surfaces facing each other, in particular on both sides of guide blocks of the track belt, in order to guide the track belt. Due to the arrangement of two drive wheels, it is possible to partially remove and/or maintain a traction wheel even while the track belt is installed, whereby, for example, the amount of time and money required for repair or maintenance work can be reduced.

The invention also relates to a track roller unit for an agricultural working machine comprising at least one traction wheel which is described and designed as explained above.

The invention also relates to an agricultural working machine, in particular a tractor or a self-propelled harvesting machine, comprising at least one track roller unit which is described and designed as explained above.

BRIEF DESCRIPTION OF THE DRAWINGS

The invention is explained in greater detail in the following with reference to the attached drawings.

In the drawings.

DETAILED DESCRIPTION OF THE EMBODIMENTS

Figure 1:
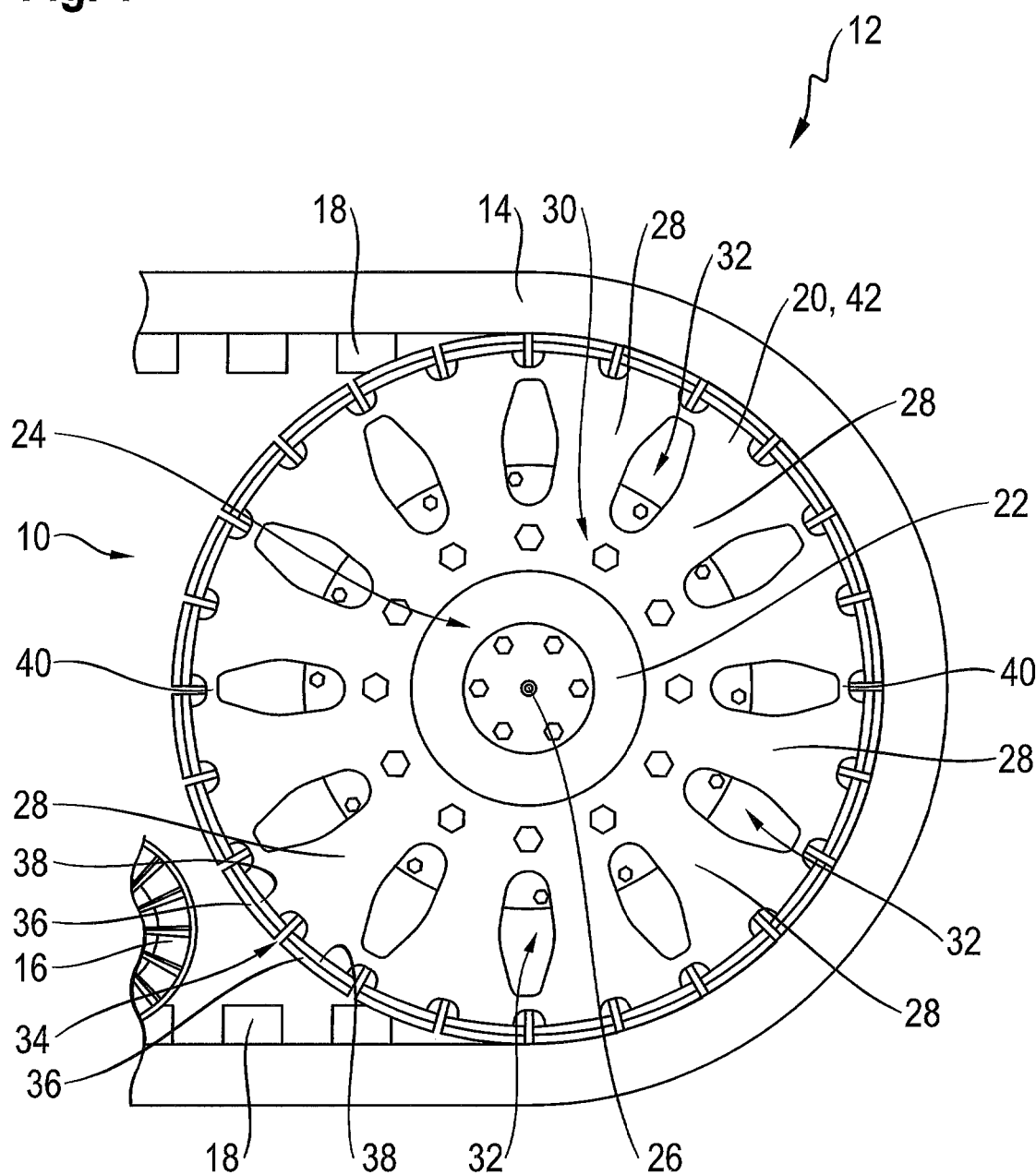
FIG. 1: shows a schematic side view of a traction wheel of a track roller unit of an agricultural working machine, comprising a rubber track belt.

In FIG. 1, a traction wheel 10 of a track roller unit 12 of an agricultural working machine, such as a tractor (not shown), is represented. The design of a track roller unit comprising an elastic track belt will not be addressed in detail, since this is considered to be known to a person skilled in the art. A working machine in the sense of the invention can also be a construction machine comprising track roller units, or a self-propelled harvesting machine, such as a combine harvester or a forage harvester.

The track roller unit 12 comprises an elastic track belt 14 which is made of rubber, for example, and revolves endlessly, in order to support the agricultural working machine on the ground. The track belt 14 is driven and set into rotation by the traction wheel 10 in this case, and runs over at least one guide roller (not shown), at which the track belt 14 is redirected, and over track-supporting rollers 16, by means of which the working machine can be supported on the ground. The drive of the track belt 14 takes place, in this case, via a non-positive, in particular, frictional connection radially on the outside between the traction wheel 10 and an inner surface of the track belt 14. For lateral guidance, the track belt 14 comprises guide blocks 18 arranged on the inside, which are situated essentially in the center of the track belt 14 and between the inner surfaces interacting with the traction wheel 10.

According to the invention, the traction wheel 10 comprises at least one drive wheel 20 which is detachably connected via a wheel hub 22 to a drive axle 24 of the track roller unit 12 and can be driven by said drive axle. The drive axle 24 and the traction wheel 10 or the drive wheel 20 are mounted, in this case, so as to be rotatable about an axis of rotation 26. The drive wheel 20 is situated on one side of the guide blocks 18 of the track belt 14 and is at least partially wrapped around by the track belt 14, radially on the outside. The drive wheel 20 comprises a plurality of supporting arms 28 which extend from the axis of rotation 26 in the radial direction in the manner of spokes. The supporting arms 28 originate, in this case, radially on the inside from an annular installation area 30 which can be detachably connected to the wheel hub 22. The supporting arms 28 are designed so as to be spaced apart from each other, whereby a recess 32 is formed, in this case, between every two adjacent supporting arms 28, through which recess even heavy debris can be conveyed out of the track roller unit 12 and the traction wheel 10.

A gap 34 is formed, radially on the outside, between the supporting arms 28 in each case, which gap extends in the axial direction across the entire width of the drive wheel 20. Debris, which adversely affects the frictional force between the traction wheel 10 or the drive wheel 20, between the traction wheel 10 or the drive wheel 20 and the track belt 14 can be removed via these gaps 34. In addition to the gaps 34 between the supporting arms, gaps 34 are also formed radially outwardly in the supporting arms 28, which also extend in the axial direction across the entire width of the drive wheel 20 or the supporting arms 28. The gaps 34 can have a greater extension, radially on the inside, in the circumferential direction. As a result, there is sufficient space radially on the inside of a gap 34 for reliably removing debris which can then be ejected out of the traction wheel 10, for example, laterally in the axial direction, in the direction of the axis of rotation 26.

In order to improve the power transmission between the traction wheel 10 or the drive wheel 20 and the track belt 14, friction elements 36 are situated, in particularly detachably, radially outwardly on the supporting arms 28. These friction elements 36 are designed in the form of flat rubber blocks, whereby not only is the power transmission improved, but wear of the track belt 14 can also be reduced. In the represented embodiment of the drive wheel 20, two friction elements 36 are situated radially outwardly on the ends of a supporting arm 28 in each case, wherein a gap 34 is formed between every two adjacent friction elements 36. In order to simplify installation and improve power transmission, the friction elements 36 are fastened to supporting elements 38 which are detachably fixed on the ends of the supporting arms 28. A friction element 36 can be designed as one piece or multiple pieces. In addition, the friction element 36 can be detachably connected to the supporting element 38. A one-piece embodiment of the friction element 36 comprising a supporting element 38 is also conceivable, wherein the friction element 36 can be connected to the supporting element 38, for example, in a positive and/or bonded manner, for example, via vulcanization.

The supporting elements 38 are designed in the form of flat sheet-metal parts and can have essentially the same extension in the circumferential direction as an associated friction element 36, whereby the dimensions of a gap 34 between the friction elements 36 are not adversely affected. The supporting arms 28 are connected radially outwardly by means of webs 40 in each case, whereby the strength of the drive wheel 20 can be increased. The webs 40 are situated in the interior of the gap 34 in this case, without adversely affecting their function. The webs 40 are each situated radially outside the recesses 32 and inside an associated gap 34.

Figure 2:
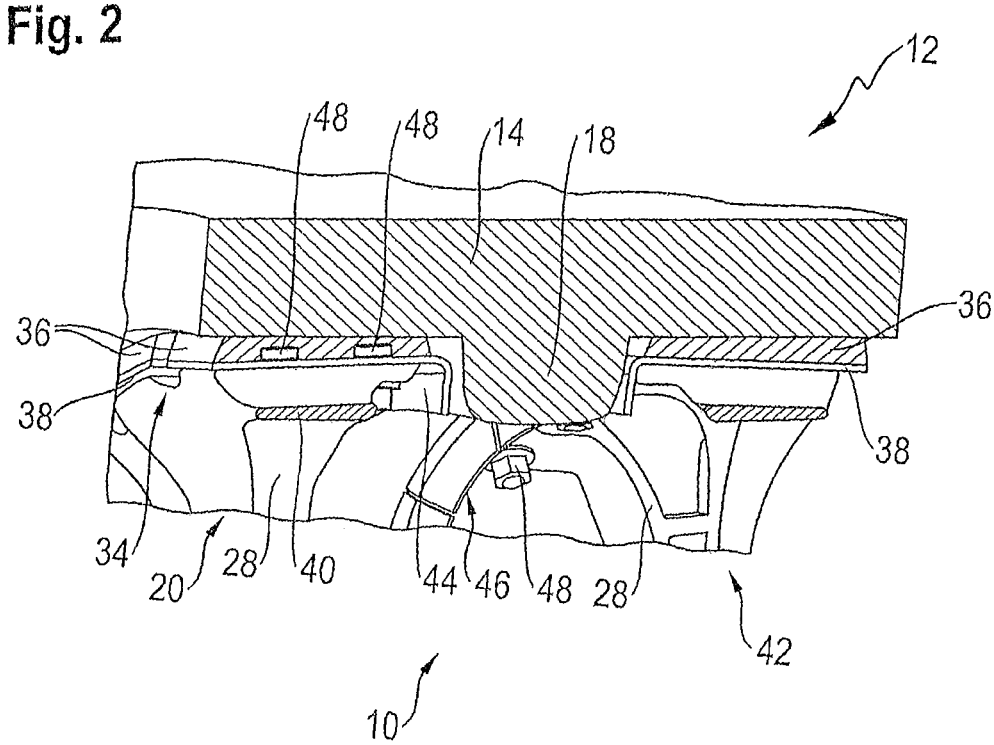
FIG. 2: shows a schematic sectional view of the traction wheel comprising two drive wheels, and of the track belt from FIG. 1 lying thereon.

The traction wheel 10 (FIG. 2) comprises, in addition to the drive wheel 20, yet another drive wheel 42 which can be designed essentially identically to the first drive wheel 20. The drive wheels 20, 42, which form the traction wheel 10, are detachably fastened, spaced apart from each other, to the drive axle 24 in each case. The drive wheels 20, 42 are situated on the track belt 14 in such a way, in this case, that one drive wheel 20, 42 is situated on every side of the guide blocks 18, in each case, in order to reliably guide the track belt 14. In order to guide the track belt 14, the supporting elements 38 each include, in particular on the guide-block side, a guide profile 44 which is designed in the shape of an essentially right-angled chamfer. The guide profiles 44 can have a greater extension in the circumferential direction than the section of the supporting element 38 supporting a friction element 36, or than a friction element 36. As a result, the guide profiles 44 of adjacent supporting elements 38 can form an essentially closed, annular guide surface 46 for interacting with guide blocks 18 of the track roller unit 14. The supporting elements 38 are detachably fastened to the ends of the supporting arms 28 by means of fasteners 48, for example, screws. The friction elements 36, which are situated, in an installed state, between supporting elements 38 or the supporting arms 28 and the track belt 14, can be detachably fastened to the supporting elements 38 or the supporting arms 28 in a bonded manner, for example, by means of adhesive, and/or by means of fasteners 48.

Figure 3:
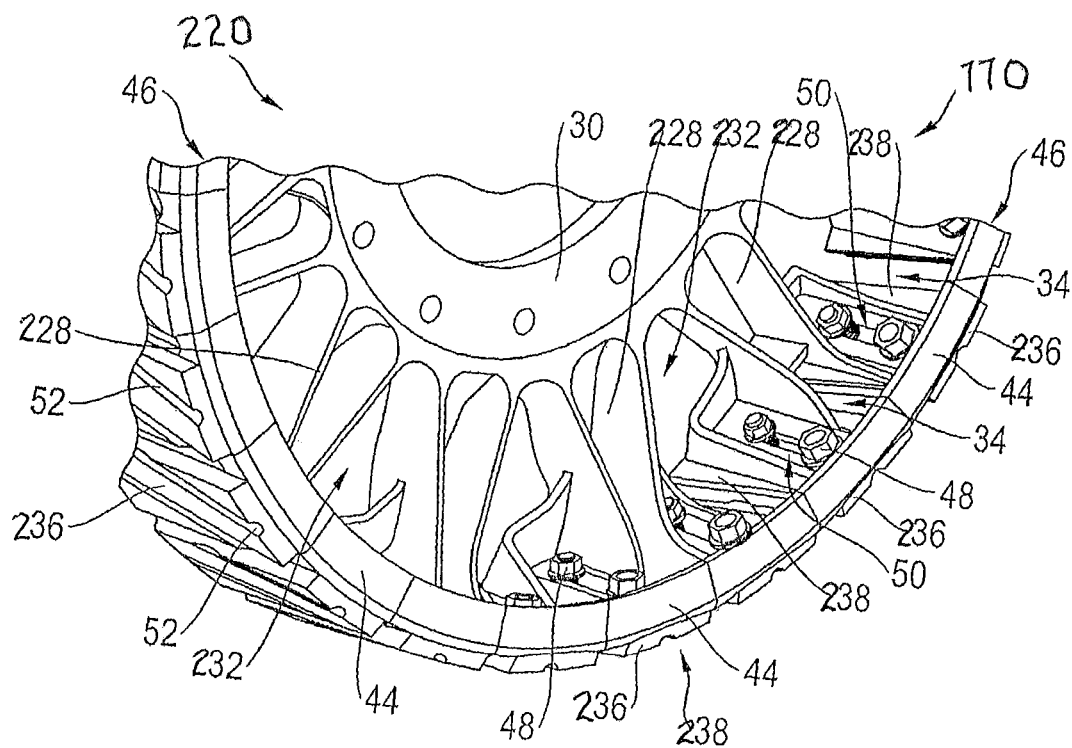
FIG. 3: shows a schematic perspective representation of one alternative embodiment of a drive wheel.

The drive wheel 220 of a traction wheel 110 represented in FIG. 3 has an alternative design of the supporting arms 228 which are situated next to each other so as to be unconnected and without webs. The recesses 232 between the supporting arms 228 are larger than the recesses shown in FIG. 1, due to a narrower design of the supporting arms 228. The friction elements 36 or the supporting elements 238 are situated in pairs, radially on the outside, on the supporting arms 228. The supporting elements 238 are detachably fastened to the supporting arms 228 by means of fasteners 48 in the form of screws. The fasteners 48 can be connected in a rotationally fixed manner to the particular supporting element 238 in a positive and/or bonded manner, for example, by means of pressing-in. The fasteners 48 can be enclosed by the friction element 236 in this case, or can be accessible through an access opening (not shown) in the friction element 236, for example, for installation.

The supporting arms 228 each have a connecting profile 50 in order to accommodate the supporting elements 238. The connecting profile 50 is designed in the form of a slot in each case, through which the fasteners 48 of the supporting element 238 protrude. Due to the slots, the supporting elements 238 are displaceable in the axial direction, in parallel to the axis of rotation 26, and thereby allow for an adaptation to the particular track belt 14, for example, before fastening. In this way as well, a simple replacement, as necessary, of a supporting element 238 and/or a friction element 236 situated thereon is made possible. The friction elements 238 each comprise tread grooves 52 radially on the outside. The supporting elements 238 and/or friction means 236 are situated on the drive wheel 220 essentially in parallel to the axis of rotation 26. An angled arrangement is also conceivable, whereby a profile can be created, which can be adapted to different environmental conditions and/or track belts.

LIST OF REFERENCE SIGNS 10 traction wheel
12 track roller unit
14 track belt
16 track-supporting roller 18 guide block
20 drive wheel
22 wheel hub
24 drive axle
26 axis of rotation
28 supporting arm
30 installation area
32 recess
34 gap
36 friction element
38 supporting element
40 web
42 drive wheel
44 guide profile
46 guide surface
48 fastener
50 connecting profile
52 tread groove

What is claimed is:

1. A traction wheel for a track roller unit of an agricultural working machine, comprising:
   at least one drive wheel for driving an elastic track belt of the track roller unit, the at least one drive wheel comprising supporting arms that extend from an axis of rotation of the drive wheel in a radial direction in a manner of spokes, wherein a gap is formed radially on an outside of the drive wheel and extending into the drive wheel, at least between two adjacent supporting arms, so that there is exactly one gap extending interiorly between each two adjacent supporting arms, and
   at least one friction element detachably connected, radially outwardly on one of the supporting arms for non-positive interaction with the track belt,
   a web situated between mutually adjacent supporting arms, said web connecting the supporting arms to each other radially in an interior of the gap, and
   at least one supporting element situated radially on the outside and detachably on one of the supporting arms, wherein the at least one friction element is situated radially on the outside and detachably on the at least one supporting element.

2. The traction wheel as claimed in claim 1, wherein one of the supporting arms and/or the at least one supporting element has a connecting profile for a non-positive and/or positive accommodation of the at least one friction element.

3. The traction wheel as claimed in claim 1, wherein the at least one supporting element includes a guide profile for interacting with guide blocks of the track belt.

4. The traction wheel as claimed in claim 3, wherein there are multiple supporting elements and guide profiles, and wherein the guide profiles of the supporting elements form an essentially annular, continuous, guide surface about an axis of rotation.

5. The traction wheel as claimed in claim 1, wherein the supporting element and/or the friction element is situated on the supporting arms, radially on the outside, essentially in parallel to or angled with respect to an axis of rotation of the traction wheel.

6. The traction wheel as claimed in claim 1, wherein the traction wheel comprises two drive wheels which are situated in a rotationally fixed manner and spaced apart from each other on a drive axle.

7. A track roller unit for an agricultural working machine, comprising at least one traction wheel as claimed in claim 1.

8. An agricultural working machine, comprising at least one track roller unit as claimed in claim 7.

* * * * *